United States Patent
De Santis

(10) Patent No.: US 11,976,702 B2
(45) Date of Patent: May 7, 2024

(54) SPRING-DAMPER ELEMENT FOR THE MOUNTING OF A PUNCHING PRESS

(71) Applicant: Bruderer AG, Frasnacht (CH)

(72) Inventor: Ugo De Santis, Roggwil (CH)

(73) Assignee: BRUDERER AG, Frasnacht (CH)

( * ) Notice: Subject to any disclaimer, the term of this patent is extended or adjusted under 35 U.S.C. 154(b) by 595 days.

(21) Appl. No.: 16/635,636

(22) PCT Filed: Sep. 15, 2017

(86) PCT No.: PCT/CH2017/000084
§ 371 (c)(1),
(2) Date: Jan. 31, 2020

(87) PCT Pub. No.: WO2019/051619
PCT Pub. Date: Mar. 21, 2019

(65) Prior Publication Data
US 2021/0131524 A1  May 6, 2021

(51) Int. Cl.
*F16F 15/02* (2006.01)
*B26D 5/12* (2006.01)
(Continued)

(52) U.S. Cl.
CPC ............ *F16F 15/0232* (2013.01); *B26D 5/12* (2013.01); *B26D 7/2614* (2013.01); *B26F 1/40* (2013.01);
(Continued)

(58) Field of Classification Search
CPC .. F16F 15/0232; F16F 15/022; F16F 15/0275; F16F 13/002; F16F 2222/12;
(Continued)

(56) References Cited

U.S. PATENT DOCUMENTS 3,419,114 A * 12/1968 Rumsey ................ F15B 11/048
188/280
4,153,237 A * 5/1979 Supalla .................. B60G 17/04
188/266.8
(Continued)

FOREIGN PATENT DOCUMENTS

DE     1111040 B      7/1961
DE     2419607 A1    10/1975
(Continued)

OTHER PUBLICATIONS

International Search Report for Serial No. PCT/CH2017/000084 dated May 18, 2018.
(Continued)

*Primary Examiner* — Xuan Lan Nguyen
(74) *Attorney, Agent, or Firm* — McCormick, Paulding & Huber, PLLC

(57) ABSTRACT

The invention relates to a spring-damper element (2) for mounting a punching press (1), with a hydraulic damper unit (3) with a first fluid chamber (4) and a second fluid chamber (5), wherein, in the intended operation, a hydraulic fluid is displaced from the first fluid chamber (4) via a throttle point (6) into the second fluid chamber (5) when the spring-damper element (2) is compressed. The damper unit further comprises an overload valve (7) arranged between the first fluid chamber (4) and the second fluid chamber (5), which overload valve opens when a specific fluid pressure is reached in the first fluid chamber (4) or when a specific pressure difference is reached between the first fluid chamber (4) and the second fluid chamber (5) and releases a bypass (8) via which hydraulic fluid then flows from the first fluid chamber (4) into the second fluid chamber (5) bypassing the throttle point (6). Thereby, the spring-damper element (2) is designed in such a way that the fluid pressure or the pressure difference, respectively, at which the overload
(Continued)

valve (7) opens can be adjusted when the spring-damper element (2) is installed as intended. With such spring-damper elements according to the invention, it becomes possible to create a mounting arrangement for a punching press, the damping characteristics of which can be adjusted without significant effort, such that a variable operation of the press in wide ranges becomes possible while keeping the ground loading to a minimum in each case.

18 Claims, 4 Drawing Sheets

(51) Int. Cl.
  *B26D 7/26* (2006.01)
  *B26F 1/40* (2006.01)
  *F16F 15/023* (2006.01)
  *F16F 15/027* (2006.01)
  *F16F 13/00* (2006.01)

(52) U.S. Cl.
  CPC ........ *F16F 15/022* (2013.01); *F16F 15/0275* (2013.01); *F16F 13/002* (2013.01); *F16F 2222/12* (2013.01); *F16F 2228/066* (2013.01); *F16F 2230/08* (2013.01); *F16F 2230/18* (2013.01); *F16F 2230/186* (2013.01); *F16F 2232/08* (2013.01); *F16F 2234/02* (2013.01); *F16F 2236/04* (2013.01)

(58) Field of Classification Search
  CPC ............. F16F 2228/066; F16F 2230/08; F16F 2230/18; F16F 2230/186; F16F 2232/08; F16F 2234/02; F16F 2236/04; B30B 15/0076; B26D 5/12; B26D 7/2614; B26F 1/40
  See application file for complete search history.

(56) References Cited

U.S. PATENT DOCUMENTS

| | | | | |
|---|---|---|---|---|
| 4,551,104 | A | * | 11/1985 | Iwashita ................ B63H 20/10 440/61 G |
| 4,834,088 | A | * | 5/1989 | Jeanson ................ F16F 9/5123 188/269 |
| 4,916,951 | A | * | 4/1990 | Messner ............. B30B 15/0076 72/448 |
| 5,588,641 | A | * | 12/1996 | Sand ..................... F16F 9/0209 72/348 |
| 5,802,966 | A | * | 9/1998 | Schoch ............... F16F 15/0232 248/550 |
| 7,413,062 | B2 | * | 8/2008 | Vandewal .......... B60G 17/0416 188/266.5 |
| 9,885,398 | B2 | * | 2/2018 | Mochizuki .............. F16F 9/096 |
| 2012/0255822 | A1 | | 10/2012 | Ito |
| 2018/0216692 | A1 | * | 8/2018 | Coaplen .................. F16F 9/348 |

FOREIGN PATENT DOCUMENTS

| | | | |
|---|---|---|---|
| EP | 0270762 A1 | 6/1988 | |
| JP | S63-260700 A | 10/1988 | |
| JP | 05116000 A * | 5/1993 | ......... B30B 15/0076 |
| JP | H06262399 A | 9/1994 | |
| JP | 2013-50174 A | 3/2013 | |
| JP | 2014-214754 A | 11/2014 | |

OTHER PUBLICATIONS

Notice of Refusal for Japanese Patent Application No. 2020-500691 dated Jun. 14, 2021.

* cited by examiner

SPRING-DAMPER ELEMENT FOR THE MOUNTING OF A PUNCHING PRESS

CROSS-REFERENCE TO RELATED APPLICATIONS

This application is a National Stage application of International Patent Application No. PCT/CH2017/000084, filed on Sep. 15, 2017, which is hereby incorporated by reference in its entirety.

TECHNICAL FIELD

The invention relates to a spring-damper element for the mounting of a punching press, the use of the spring-damper element for the mounting of a punching press, as well as methods for operating punching presses which are mounted on such spring-damper elements, according to the preambles of the independent patent claims.

BACKGROUND

Large punching presses with more than 200 kN nominal load are—equipped with mass balancing and spring-damper elements. They do not require special foundations and do also not have to be fixed to the ground. The machine and the spring-damper elements together form a single-mass oscillator with a relatively low resonance frequency of e.g. 2.5 Hz or 150 min−1, respectively.

The spring-damper elements thereby fulfil several functions. On the one hand, they serve to reduce the ground loading from dynamic mass forces, to—prevent the machine from "building up vibrations" in the resonance range, and to reduce the machine movement when the press is coupled in and out. On the other hand, they serve to guide the punching press in the horizontal plane.

When designing the mass compensation of the presses, an average weight for the upper tool part is taken into account, from which the actual tool weight often deviates significantly.

Accordingly, different punching jobs can result in different operating conditions with regard to the vibration excitation of the system due to different imbalance masses and punching frequencies, which makes it hardly possible to design the spring-damper elements for a variable operation.

When designing the spring-damper elements for an operation at high punching frequencies, the problem typically arises that very large amplitudes result in the operation at low punching frequencies, which can significantly impair the range of application of the press.

When designing the spring-damper elements for an operation at low punching frequencies close to the resonance frequency, the problem arises that unnecessarily high ground loadings typically occur in the operation with relatively high punching frequencies. In general, in this design, also the problem arises that the impact forces from the punching impact are transmitted to the ground via the spring-damper elements, which then leads to a very high short-term ground loading.

From EP 0 270 762 A1 there are known generic spring-damper elements, in which the latter problem is tackled by a pressure relief valve in the damper piston, which limits the supporting pressure of the spring-damper element and thus the maximum ground loading.

SUMMARY

The objective arises to provide technical solutions which do not exhibit the aforementioned disadvantages of the state of the art or which at least partially avoid them.

This objective is solved by the subject-matter of the independent patent claims.

According to these, a first aspect of the invention relates to a spring-damper element for the mounting of a punching press.

The spring-damper element comprises a hydraulic damper unit. This comprises a first fluid chamber and a second fluid chamber, wherein during the intended operation a hydraulic fluid is displaced from the first fluid chamber via a throttle point into the second fluid chamber when the spring-damper element is compressed, and thus a damping effect is achieved. An overload valve is arranged between the first fluid chamber and the second fluid chamber of the damper element, which overload valve opens when a specific fluid pressure is reached in the first fluid chamber or when a specific pressure difference is reached between the first fluid chamber and the second fluid chamber and releases a bypass via which hydraulic fluid then flows from the first fluid chamber into the second fluid chamber, bypassing the throttle point, thereby substantially preventing a further increase in pressure in the first fluid chamber. The fluid pressure or the pressure difference, respectively, at which the overload valve opens can be adjusted in steps or steplessly when the spring-damper element is installed as intended, in particular manually, particularly without tools, and/or automatically by means of a control system with externally actuated adjustment means, such e.g. as actuators or pneumatic cylinders.

With the spring-damper elements according to the invention it becomes possible to create a mounting arrangement for a punching press, the damping characteristics of which can be adjusted without significant effort, such that a variable operation of the press in wide ranges becomes possible while keeping the ground loading to a minimum in each case.

In an advantageous embodiment of the spring-damper element, its hydraulic damper unit is designed in such a way that, in the intended operation, during rebound of the spring-damper element, hydraulic fluid flows back from the second fluid chamber into the first fluid chamber via a flow cross-section which is wider than the throttle cross-section. The damper unit therefore works essentially in the direction of compression in this embodiment and has no or a significantly-lower damping effect in the direction of rebound than in the direction of compression. This makes it possible to dispense with a fastening the spring-damper elements on the ground.

Preferably, the hydraulic damper unit of the spring-damper element is designed in such a way that the fluid pressure or pressure difference, respectively, at which the overload valve opens is adjustable during intended operation. This makes it possible to set the optimum damping for the respective operating state during operation, in particular by means of a control system which determines the parameters of the vibration movement, such as amplitudes and accelerations, and adjusts the damping of the spring-damper elements until a desired parameter-constellation is reached.

In another preferred embodiment of the spring-damper element, its hydraulic damper unit is designed in such a way that the fluid pressure or the pressure difference, respectively, at which the overload valve opens can be set practically to zero, such that when the spring-damper element is compressed, the overload valve opens without any noteworthy pressure build-up in the first fluid chamber, as a result of which the hydraulic damper unit is practically ineffective at least in the direction of compression.

Alternatively, the hydraulic damper unit is designed in such a way that the overload valve can be brought into an open state such that the hydraulic fluid can flow back and forth between the first and second fluid chambers in a practically unhindered manner when the spring-damper element is compressed or rebound, as a result of which the hydraulic damper unit is practically ineffective in both the compression and the rebound direction.

In yet another preferred embodiment of the spring-damper element, its hydraulic damper unit comprises a switchable bypass valve between the first fluid chamber and the second fluid chamber, which releases a bypass in the open state, via which hydraulic fluid flows from the first fluid chamber into the second fluid chamber while bypassing the throttle point when the spring-damper element is compressed, and via which hydraulic fluid flows from the second fluid chamber into the first fluid chamber when the spring-damper element is rebound, such that the hydraulic damper unit is practically ineffective in both the compression and the rebound direction.

With the aforementioned preferred embodiments of the spring-damper element, the damper unit can be made practically ineffective for an operation with relatively high punching frequencies, such that the ground loadings are minimized.

With an advantage, the spring-damper element comprises a pneumatic cylinder for setting the fluid pressure or the pressure difference, respectively, at which the overload valve opens, which pneumatic cylinder, during intended operation, is pressurized with a specific air pressure and therefore generates a specific valve closing force. Thereby, a sensitive and easy to automate setting can be realized in a simple manner.

Alternatively or in addition, it is preferred that the spring-damper element for setting the fluid pressure or the pressure difference, respectively, at which the overload valve opens comprises a threaded spindle which acts on one or more valve springs and thereby generates a certain valve closing force. Thereby, a manual adjustment can be realized in a particularly simple and reliable manner.

A second aspect of the invention relates to the use of the spring-damper element according to the first aspect of the invention for mounting a punching press. In such uses, the advantages of the invention are particularly obvious.

A third aspect of the invention relates to a method for operating a punching press mounted on spring-damper elements according to the first aspect of the invention. Thereby, at different intended operating conditions, the punching press is respectively operated with different settings of the fluid pressure or pressure difference, respectively, at which the overload valves of the spring-damper elements open.

A fourth aspect of the invention relates to another method for operating a punching press which is mounted on spring-damper elements according to the first aspect of the invention. Thereby, the setting of the fluid pressure or the pressure difference, respectively, at which the overload valves of the spring-damper elements open is adjusted during the intended operation of the punching press to change the amplitude with which the punching press oscillates in the spring-damper elements.

With the inventive methods according to the third and fourth aspect of the invention, which are advantageously combined, it becomes possible to adapt the damping characteristics of the mounting of the punching press to the respective operating condition, such that a variable operation of the press in wide ranges becomes possible at minimum ground loading in each case.

Thereby, it is further preferred that the adjustment of the fluid pressure or the pressure difference, respectively, at which the overload valves of the spring-damper elements open is changed in such a way that the punching press oscillates with a certain amplitude in the spring-damper elements, preferably with a maximum permissible amplitude. This makes it possible to keep ground loadings as low as possible, especially when operating at low punching frequencies close to the resonance frequency.

Preferably, thereby, the amplitude is measured, e.g. by means of one or more distance measuring sensors, and the adjustment of the fluid pressure or the pressure difference, respectively, at which the overload valves of the spring-damper elements open, is automatically controlled by a machine controller in such a way that the punching press oscillates with a desired amplitude in the spring-damper elements.

If the amplitude is measured separately for each spring-damper element and the setting of the fluid pressure or the pressure difference, respectively, at which its overload valve opens is controlled, the oscillation behavior of the punching press can be further optimized, e.g. pitching movements due to uneven load distribution can be compensated for.

The adjustment of the fluid pressure or the pressure difference, respectively, at which the overload valves of the spring-damper elements open, is preferably effected with the aid of pneumatic cylinders, which are subjected to a certain air pressure and generate a corresponding valve closing force. Thereby, a sensitive and easy to automate setting can be realized in a simple manner.

Alternatively or in addition, it is preferred to adjust the fluid pressure or the pressure difference, respectively, at which the overload valves of the spring-damper elements open with the aid of threaded spindles which act on one or more valve springs and thereby generate a valve closing force. Thereby, a manual adjustment can be realized in a particularly simple and reliable manner.

BRIEF DESCRIPTION OF THE DRAWINGS

Further embodiments, advantages and applications of the invention result from the dependent claims and from the now following description on the basis of the figures. Thereby show:

DETAILED DESCRIPTION

Figure 1:
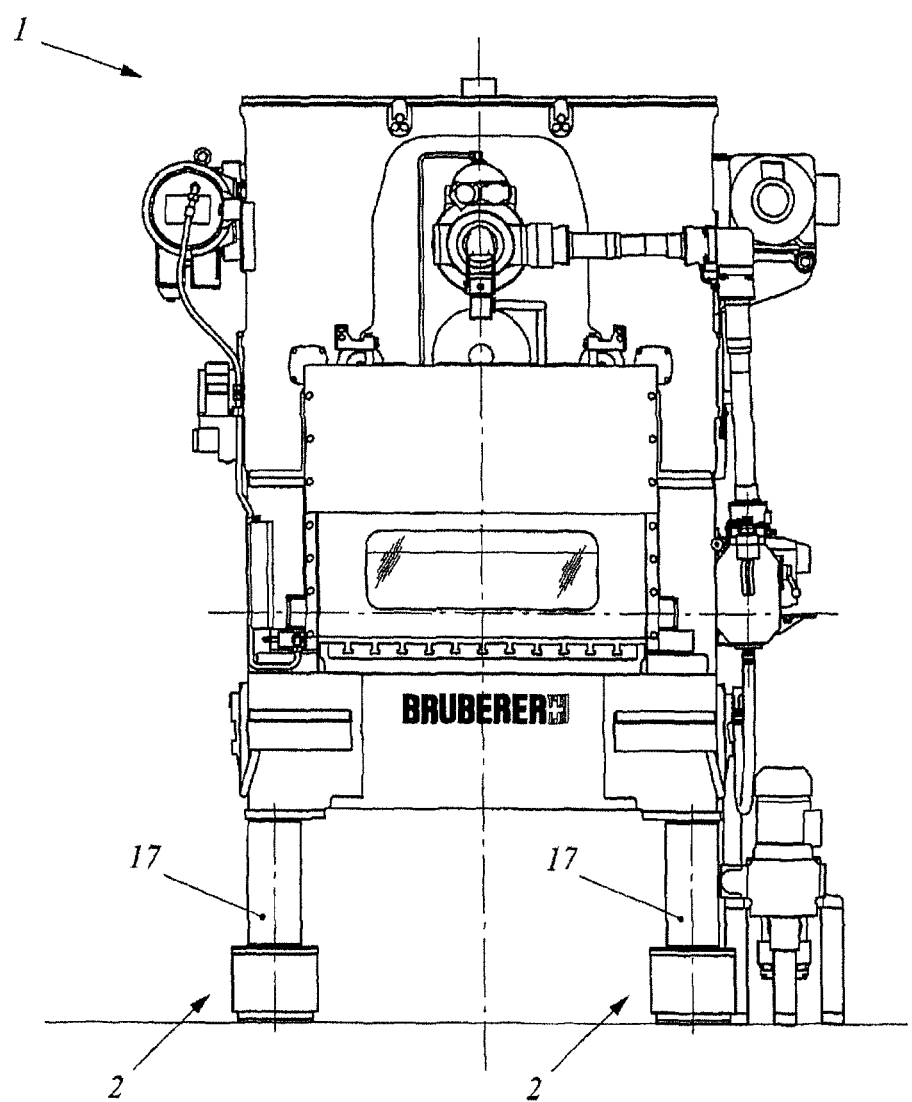
FIG. 1 a punching press which is mounted on spring-damper elements according to the invention.

FIG. 1 shows a punching press 1 which is mounted on four identical spring-damper elements 2 according to the invention on a factory floor 21.

Figure 2:
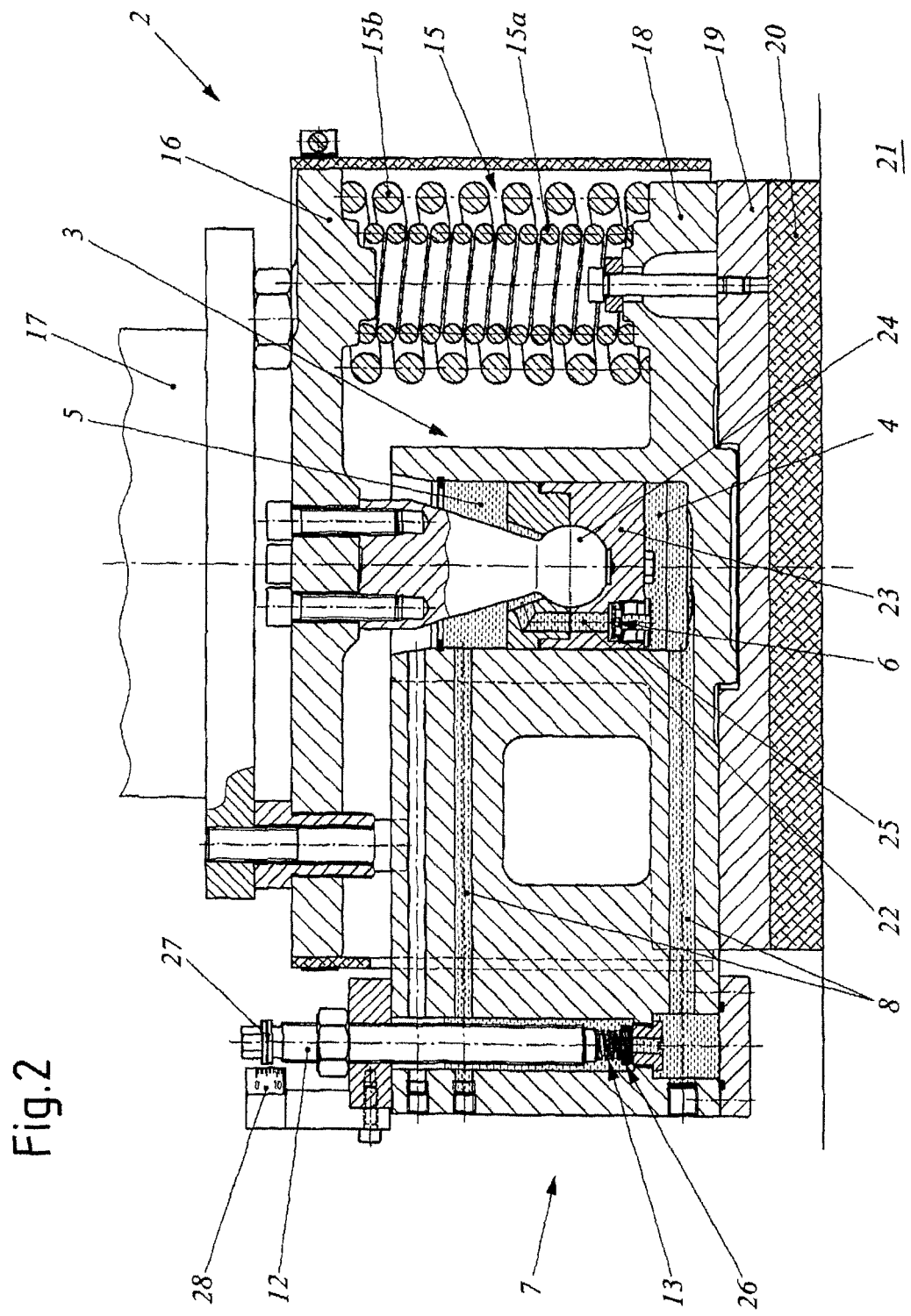
FIG. 2 a vertical section through one of the spring-damper elements from FIG. 1.

As can be seen in synopsis with FIG. 2 which shows a vertical section through one of the spring-damper elements 2, the spring-damper element 2 comprises a central hydraulic damper unit 3 which is surrounded by six helical spring packages 15 arranged with uniform pitch on a concentric circle around it, over which a support plate 16 which supports a support column 17 of the punching press 1, is supported on a support body 18, which comprises the hydraulic damper unit 3 and is supported on the floor 21 over a floorplate 19 and a damping mat 20 arranged underneath it. Each of the helical spring packages 15 comprises a smaller coil spring 15a and a larger coil spring 15b, whereby the smaller coil spring 15a is arranged concentrically within the larger coil spring 15b.

The hydraulic damper unit 3 comprises a first fluid chamber 4 and a second fluid chamber 5 which are filled with a hydraulic fluid and are separated from each other by a damper piston 23 which is connected to the support plate 16 via a ball pin 24.

In the damper piston 23, a connection channel 22 is arranged which—extends between the first fluid chamber 4 and the second fluid chamber 5 and in which a throttle point 6 is arranged. The throttle point 6 is formed by a type of check valve, the valve closing body of which is formed by a plate 25 with a throttle bore. When pressure is applied to this check valve on its side facing the first fluid chamber 4, the plate 25 is pressed against a valve seat such that the first fluid chamber 4 and the second fluid chamber 5 are only connected to each other via the throttle bore in the plate 25. When this check valve is pressurized on its side facing the second fluid chamber 5, the plate 25 is pushed away from the valve seat and releases a flow cross-section which is significantly larger than its throttle bore, via which the first fluid chamber 4 and the second fluid chamber 5 are then connected to each other.

Accordingly, during compression of the spring-damper element 2, which results in a displacement of the damper piston 23 into the first fluid chamber 4 and subsequently in a pressure increase in the first fluid chamber 4, hydraulic fluid is displaced from the first fluid chamber 4 into the second fluid chamber 5 only via the throttle bore in the plate 25, with the effect that a damping effect is achieved during compression.

During rebound, on the other hand, a considerably larger flow cross-section is available for the return flow of hydraulic fluid from the second fluid chamber 5 into the first fluid chamber 4, and this results in a significantly lower damping effect or no damping effect at all.

As can be seen further on, the hydraulic damper unit 3 further comprises an easily accessible overload valve 7 arranged on the outside of the spring-damper element 2, which is associated with a bypass-line 8 between the first fluid chamber 4 and the second fluid chamber 5 and which opens when a specific fluid pressure is reached in the first fluid chamber 4 or when a specific pressure difference is reached between the first fluid chamber 4 and the second fluid chamber 5, such that hydraulic fluid then flows from the first fluid chamber 4 via the bypass line 8 into the second fluid chamber 5, bypassing the throttle point 6. Thereby, a further increase in pressure in the first fluid chamber 4 is prevented.

This overload valve 7 essentially consists of a valve plate 26 which is pressed against a valve seat by a spring 13. The spring preload can be adjusted with a threaded spindle 12 or it can be revoked completely. At the top of the threaded spindle 12, a marking edge 27 is arranged directly opposite a scale 28, by means of which the set spring preload can be metered.

Figure 3:
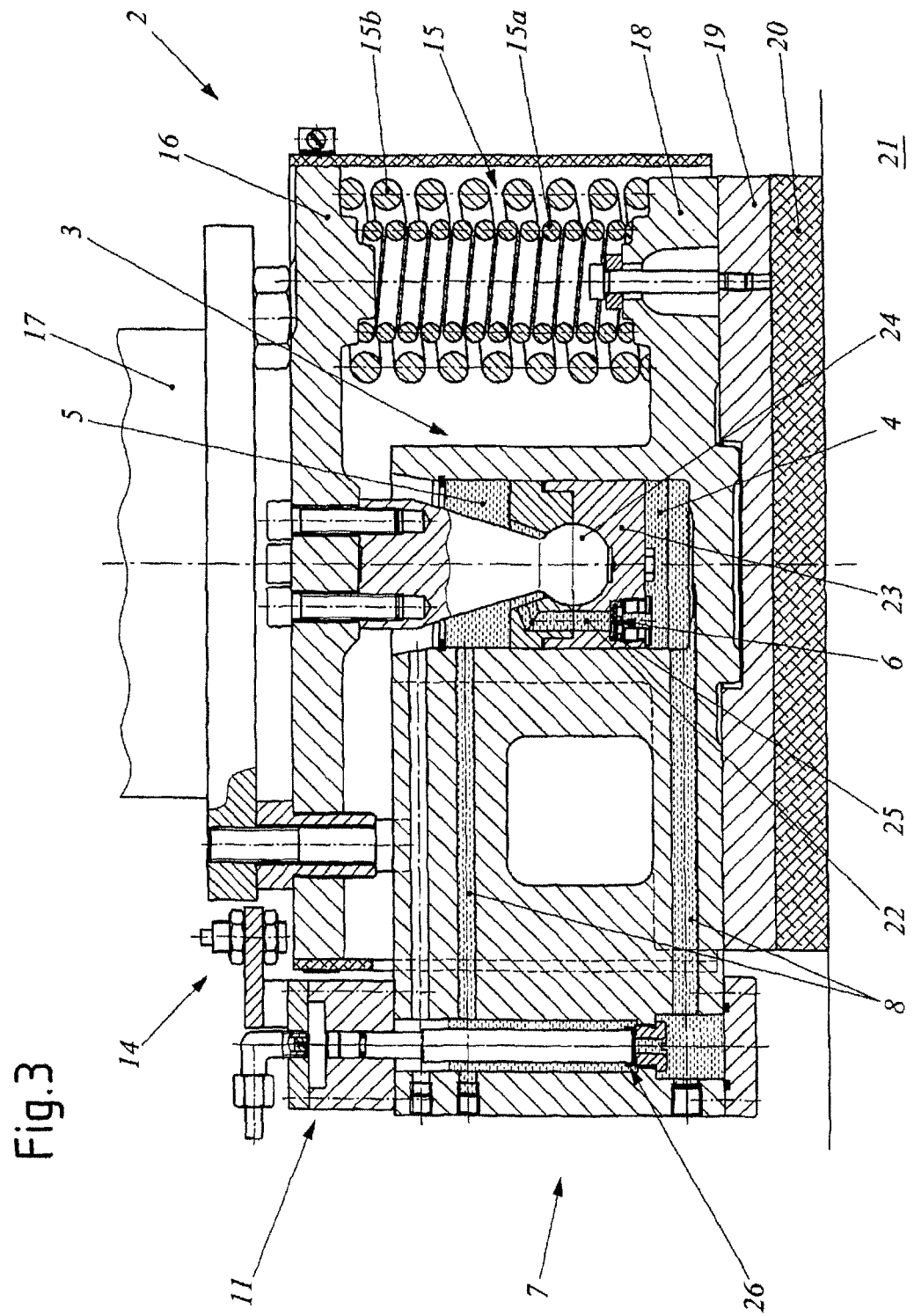
FIG. 3 a vertical section through a first variant of the spring-damper element from FIG. 2.

FIG. 3 shows a vertical section through a first variant of the spring-damper element, which differs from the spring-damper element shown in FIG. 2 only in that the valve plate 26 of the overload valve 7 is not loaded by a spring pretensioned by means of a threaded spindle, but by means of a pneumatic cylinder 11 which is pressurized with a specific air pressure in accordance with the desired opening pressure. This spring-damper element also has a distance measuring sensor 14, by means of which the oscillating movement of the punching press is detected by a machine controller (not shown) and the compressed air supply to the pneumatic cylinder 11 is automatically regulated in such a way that the punching press 1 oscillates with a desired amplitude in the spring-damper elements 2.

Figure 4:
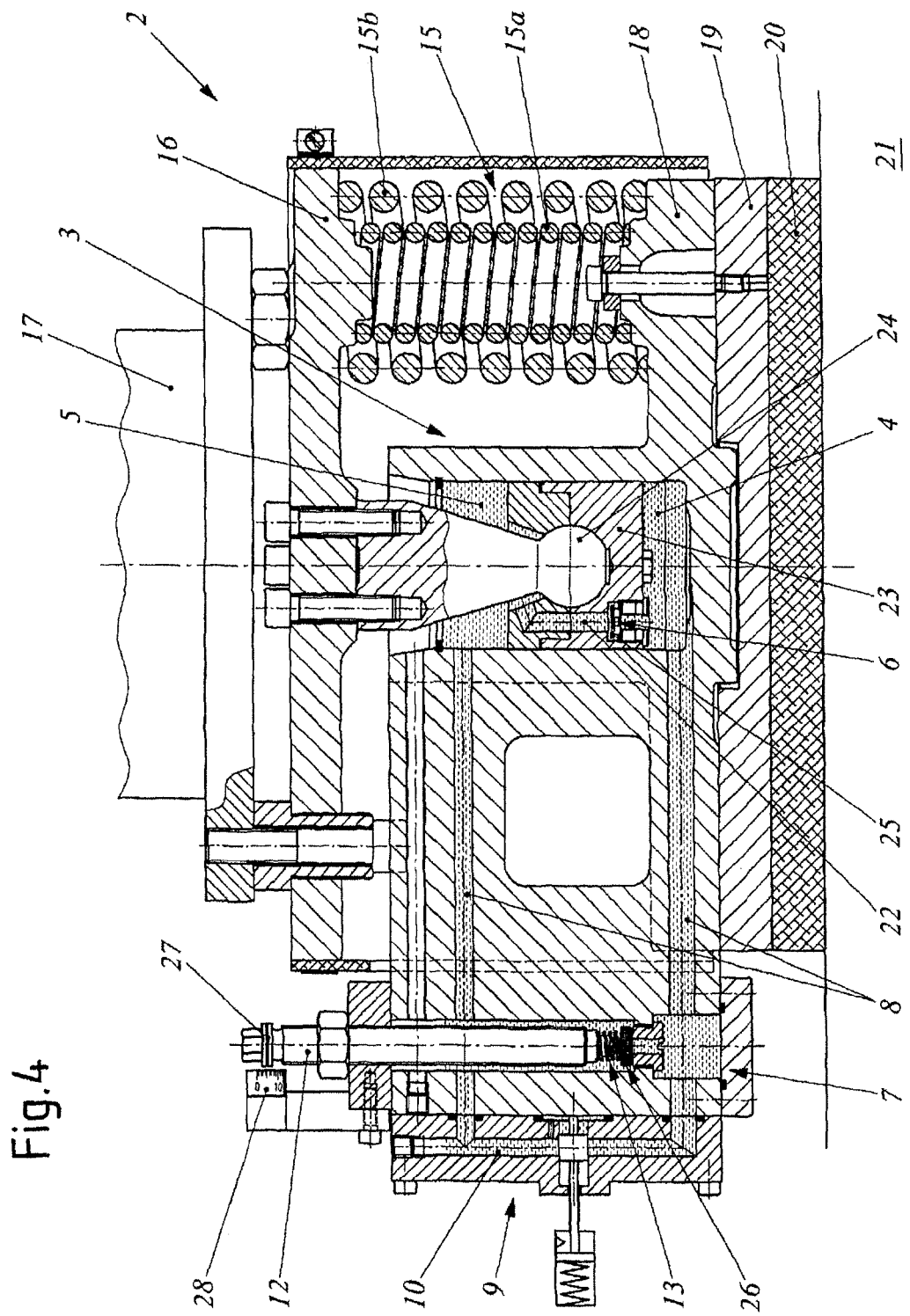
FIG. 4 a vertical section through a second variant of the spring-damper element from FIG. 2.

FIG. 4 shows a vertical section through a first variant of the spring-damper element, which differs from the spring-damper element shown in FIG. 2 only in that the hydraulic damper unit 3 additionally comprises a switchable bypass valve 9 arranged between the first fluid chamber 4 and the second fluid chamber 5, which bypass valve 9 in the open state releases a bypass 10, via which hydraulic fluid flows from the first fluid chamber 4 into the second fluid chamber 5 when the spring-damper element 2 is compressed bypassing the throttle point 6 and the overload valve 7, and hydraulic fluid flows back from the second fluid chamber 5 into the first fluid chamber 4 when the spring-damper element 2 is rebound, in such a way that practically no damping effect is present in both directions.

While in the present application preferred embodiments of the invention are described, it must be clearly pointed out that the invention is not limited to these and that it can also be realized in another way within the scope of the now following patent claims.

What is claimed is:

1. A spring-damper element for the mounting of a punching press, with a hydraulic damper unit with a first fluid chamber and a second fluid chamber, wherein, in the intended operation, a hydraulic fluid is displaced from the first fluid chamber via a throttle point of selected cross-section into the second fluid chamber during compression of the spring-damper element, and with an overload valve arranged between the first fluid chamber and the second fluid chamber, which, on reaching a specific fluid pressure in the first fluid chamber or on reaching a specific pressure difference between the first fluid chamber and the second fluid chamber, is opened by the specific fluid pressure or pressure difference and releases a bypass, via which hydraulic fluid then flows from the first fluid chamber into the second fluid chamber, bypassing the throttle point, wherein the overload valve is adjustable so that the valve is closed and fluid flow through the valve is blocked until the fluid pressure or the pressure difference, respectively, to which the overload valve is adjusted is reached and the valve opens.

2. The spring-damper element according to claim 1, wherein the throttling point of the hydraulic damper unit is a check valve that during rebound of the spring-damper element, allows hydraulic fluid to flow back from the second fluid chamber into the first fluid chamber via a flow cross-section which is wider than the selected cross-section of the throttle point.

3. The spring-damper element according to claim 1, wherein the fluid pressure or the pressure difference, respectively, at which the overload valve opens is adjustable steplessly or in steps.

4. The spring-damper element according to claim 1, wherein the fluid pressure or the pressure difference, respectively, at which the overload valve opens is manually adjustable and/or automatically adjustable via a control system.

5. The spring-damper element according to claim 1, wherein the fluid pressure or the pressure difference, respectively, at which the overload valve opens is adjustable during the intended operation.

6. The spring-damper element according to claim 1, wherein the fluid pressure or the pressure difference, respectively, at which the overload valve opens is adjustable to substantially zero or the overload valve is brought into an open state.

7. The spring-damper element according to claim 1, wherein the hydraulic damper unit comprises a switchable bypass valve arranged between the first fluid chamber and the second fluid chamber, which in the open state releases a bypass, via which hydraulic fluid flows from the first fluid chamber into the second fluid chamber during compression of the spring-damper element, bypassing the throttle point, and via which hydraulic fluid flows from the second fluid chamber into the first fluid chamber during rebound of the spring-damper element.

8. The spring-damper element according to claim 1, wherein the spring-damper element comprises a pneumatic cylinder for adjusting the fluid pressure or the pressure difference, respectively, at which the overload valve opens, which pneumatic cylinder is subjected to a specific air pressure during the intended operation.

9. The spring-damper element according to claim 1, wherein the spring-damper element comprises a threaded spindle which acts on one or more valve springs for adjusting the fluid pressure or the pressure difference, respectively, at which the overload valve opens.

10. A method for operating a punching press which is mounted on spring-damper elements according to claim 1, including the step of operating the press with different settings of the fluid pressure or the pressure difference, respectively, at which the overload valves of the spring-damper elements open, during different intended operating conditions.

11. The method for operating a punching press which is mounted on spring-damper elements according to claim 10, including the step of setting the fluid pressure or the pressure difference, respectively, at which the overload valves of the spring-damper elements open, during the intended operation of the punching press to achieve a specific amplitude with which the punching press oscillates in the spring-damper elements.

12. The method according to claim 11, including the step of setting of the fluid pressure or the pressure difference, respectively, at which the overload valves of the spring-damper elements open, to achieve a maximum permissible amplitude with which the punching press oscillates in the spring-damper elements.

13. The method according to claim 11 including the steps of measuring the amplitude by means of one or more distance measuring sensors, and adjusting the fluid pressure or the pressure difference, respectively, at which the overload valves of the spring-damper elements open to cause the punching press to oscillate with a desired amplitude in the spring-damper elements.

14. The method according to claim 13, wherein the step of measuring the amplitude is performed separately for each spring-damper element, and the step of adjusting the fluid pressure or the pressure difference, respectively, at which the overload valve opens is controlled separately for each spring-damper element.

15. The method according to claim 11, wherein the step of setting the fluid pressure or the pressure difference, respectively, at which the overload valves of the spring-damper elements open, is effected by means of pneumatic cylinders.

16. The method according to claim 11, wherein the step of setting the fluid pressure or the pressure difference, respectively, at which the overload valves of the spring-damper elements open, is effected by means of threaded spindles which act on one or more valve springs.

17. The spring-damper element according to claim 3, wherein the fluid pressure or the pressure difference, respectively, at which the overload valve opens is manually adjustable and/or automatically adjustable via a control system.

18. The spring-damper element according to claim 1, wherein the overload valve is also a one-way valve blocking flow from the second fluid chamber to the first fluid chamber regardless of pressures.

* * * * *